United States Patent [19]

Kirchgessner et al.

[11] Patent Number: 4,882,309

[45] Date of Patent: Nov. 21, 1989

[54] LIGNOSULFONATE-MODIFIED CALCIUM HYDROXIDE FOR SO2 CONTROL DURING FURNACE INJECTION

[75] Inventors: David A. Kirchgessner, Chapel Hill; Jeffrey M. Lorrain, Raleigh, both of N.C.

[73] Assignee: United States of America Environmental Protection Agency, Research Triangle Park, N.C.

[21] Appl. No.: 230,585

[22] Filed: Aug. 9, 1988

Related U.S. Application Data

[62] Division of Ser. No. 930,689, Nov. 12, 1986, Pat. No. 4,786,485.

[51] Int. Cl.$^4$ .................. B01J 20/22; B01J 20/28

[52] U.S. Cl. .................. 502/401; 252/189; 252/190; 252/192

[58] Field of Search .................. 252/189, 190, 192; 502/401

[56] References Cited

FOREIGN PATENT DOCUMENTS 53-93190  8/1978  Japan .................. 423/242

Primary Examiner—Patrick P. Garvin
Attorney, Agent, or Firm—Flehr, Hohbach, Test, Albritton & Herbert

[57] ABSTRACT

A method is provided for removing sulphur-containing gases from fossil fuel-fired combustors comprising the step of introducing sorbent particles modified with lignosulfonates into the exhaust gases.

6 Claims, 1 Drawing Sheet

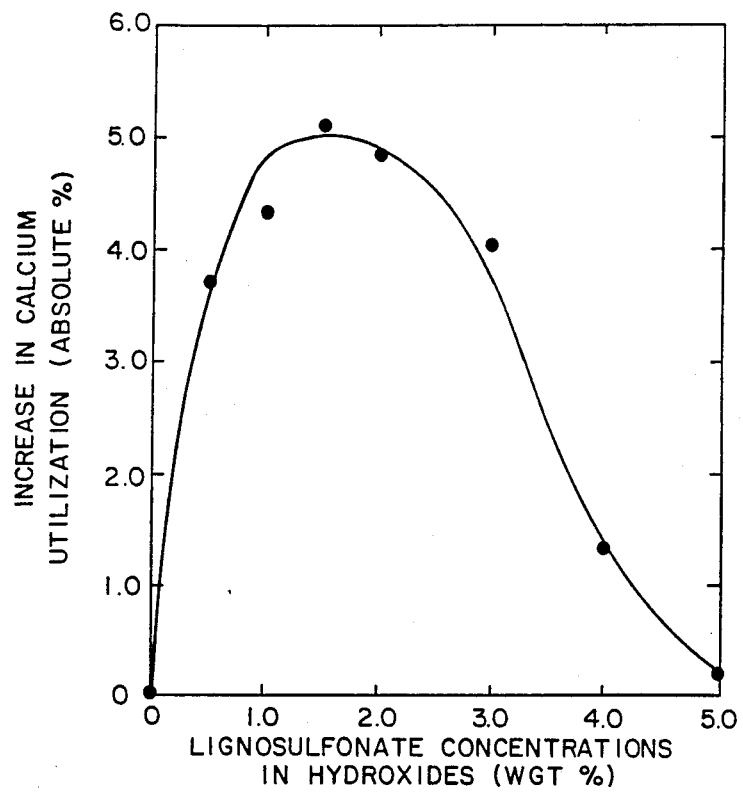
FIG.—1
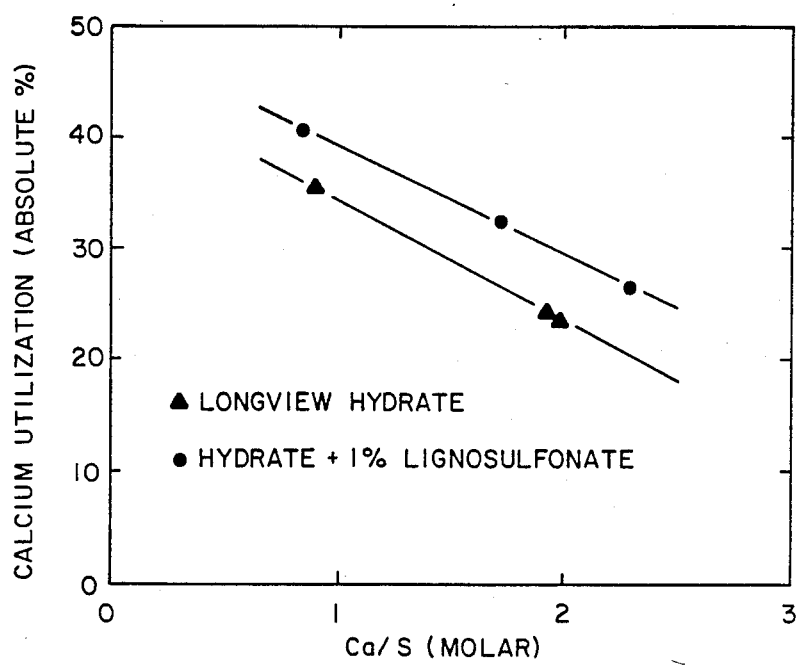
FIG.—2

LIGNOSULFONATE-MODIFIED CALCIUM HYDROXIDE FOR SO2 CONTROL DURING FURNACE INJECTION

This is a division of application Ser. No. 930,689, filed Nov. 12, 1986, now U.S. Pat. No. 4,786,485.

The present invention is directed to a method for removing sulphur-containing gases from the exhaust gases of a fossil fuel-fired combustor. In particular, the present method provides for removing sulphur-containing gases by introducing particulate surfactant-modified sorbent downstream of the flame zone of the combustor.

BACKGROUND OF THE INVENTION

Relatively costly methods exist for control of sulphur oxide pollution from fossil fuel-fired combustors, but they are most commonly applied to new facilities where the expense and control of the technology is justifiable due to the long remaining depreciable lifetime of the facility. There is a large population of older combustors in existence for which the cost-effective methods of reducing sulphur oxide emissions are not generally available due to the substantial additional capital expense which would need to be expended on an old facility. There is a need, therefore, to develop cost-efficient, retrofittable technology to control sulphur oxides and nitrogen oxides in this population of older plants.

In other methods, inorganic promoters have been added to each of the calcium-based sorbents in an effort to increase their reactivity. Promoters can increase reactivity significantly but each group of effective promoters has problems which preclude it from practical application. Transition metals such as chromium are effective in various forms but they are relatively expensive and may produce environmental side effects of their own. Alkali metal additives are aggressive promoters during natural gas-firing, but are condensed on the ash which is produced during coal-firing and are unavailable to promote $SO_2$ capture by the sorbent. There remains a need in the art, therefore, for a sorbent with an improved capability of capturing $SO_2$ that will not be depleted by ash interactions in a coal-fired combustor, and which does not introduce detrimental environmental effects.

It is thus an object of the present invention to provide a method for removing sulpher-containing gases, particularly sulphur oxides, from the exhausts of fossil fuel-fired combustors.

It is also an object of the present invention to provide an improved sorbent for removing sulphur oxides from the exhaust gases of fossil fuel-fired combustors when said sorbent is injected into, or downstream from the combustor.

These and other objects of the present invention will be apparent from the following description and appended claims.

BRIEF DESCRIPTION OF THE DRAWINGS

In accompanying drawings:

FIG. 1 is a graph of the amount of increase in calcium utilization (over unmodified control sorbent) in the sorbent utilized in accordance with the present invention versus the amount of lignosulfonate concentration in the sorbent.

FIG. 2 is a graph showing the comparison in the amounts of calcium utilization versus the calcium/sulphur ratio in two sorbents, with and without the improvement according to the present invention.

SUMMARY OF THE INVENTION

The present invention provides a method for removing sulphur-containing gases from exhaust gases of fossil fuel-fired combustors comprising the step of introducing into the exhaust gases sorbent particles capable of reacting with sulphur oxides wherein the particles comprise calcium hydroxide or calcium magnesium hydroxide and an ionic surfactant. The surfactant is preferably an alkali metal lignosulfonate. The sorbent preferably comprises 1 to 2 percent by weight calcium lignosulfonate but may contain up to 5 percent by weight calcium lignosulfonate, and is characterized by a significantly finer particle size distribution than the equivalent sorbent without lignosulfonate.

DESCRIPTION OF THE PREFERRED EMBODIMENT

To practice the method according to the present invention, a surfactant-modified sorbent is prepared. The preferred surfactant is an alkali metal lignosulfonate. The sorbent is selected from the group consisting of calcium magnesium hydroxide [$Ca(OH)_2 \cdot Mg(OH)_2$] and calcium hydroxide [$Ca(OH)_2$]. Initially, limestone ($CaCO_3$) or dolomite [$CaMg(CO_3)_2$] is calcined to its respective oxide (CaO or CaO.MgO), usually in the temperature range of 900° to 1100° C. (lime temperature) but preferably at around 1000° C. This produces a soft-burned lime characteristic of that available at commercial lime plants. The resulting oxide is then hydrated at a water to oxide ratio ranging from 2 to 3 but preferably around 2.6, with water containing the desired amount of calcium lignosulfonate or other ionic surfactant. The amount of calcium lignosulfonate utilized will be that sufficient to produce a resulting calcium hydroxide/calcium lignosulfonate product containing up to about 5 percent by weight calcium lignosulfonate. Preferably, the resulting product will contain about 1 to 2 percent calcium lignosulfonate.

The calcium lignosulfonate-modified calcium hydroxide sorbent according to the present invention results in a higher capture of $SO_2$ than an unmodified calcium hydroxide when injected into a fossil fuel-fired combustor or combustor flue system. Typically the modified sorbent will be injected into the flue where the exhaust gases are at a temperature in the range of about 65° to 1230° C. Since the improved performance is the result of a physical rather than a chemical change, the tendency of coal ash to remove the enhancement is avoided.

The lignosulfonate-modified sorbents are also improved in that they have improved handling characteristics. Commercial hydrates frequently have the tendencies to cake and agglomerate during storage and handling which cause problems at their point of use. The lignosulfonate-modified sorbents according to the present invention are characterized by a reduced amount of caking during storage and reduced amount of agglomeration during handling, thus facilitating handling and controllability of fluidization during feeding to the reactor or combustor.

While not intending to be bound to any particular theory of operation of the present invention, it is believed that the surfactant-modified sorbents according to the present invention exhibit these improved properties, at least in part, because of formation of smaller calcium hydroxide particles. Smaller particles are formed in two ways: (1) during the hydration reaction, surfactant decreases the surface energy of the nucleus/solution interface (surface tension) and thereby increases the nucleation rate. This results in a large number of small crystals rather than a small number of large crystals; (2) the tendency of small calcium hydroxide crystals to form larger particles through agglomeration is reduced by eliminating the layer of adsorbed water which surrounds such crystals. This is accomplished by introducing a hydrophobic surfactant layer around the crystals. Thus, both an increase in nucleation rate during the hydration reaction, and a decrease in adsorbed water by enhanced by hydrophobicity of crystal surfaces are effected by a small quantity of lignosulfonate.

Having described the preferred embodiment of the present invention the following examples are provided for purposes of illustration. However, the examples are not intended to limit the invention in any way.

EXAMPLE 1

A commercially available limestone, Presque Isle, was calcined to calcium oxide at 1000° C. for 16 hours. A chemical analysis of the resulting lime showed no significant quantities of known inorganic promoters. The resulting calcium oxide was then hydrated at a water to calcium oxide ratio of 2.6 with water containing varying amounts of calcium lignosulfonate. The amounts of the calcium lignosulfonate surfactant in the water were calculated to yield 0, 0.5, 1.0, 1.5, 2.0, 3.0, 4.0, and 5.0% of calcium lignosulfonate in the product calcium hydroxide. The modified calcium hydroxides were then tested for reactivity with sulphur dioxide in a laboratory scale isothermal flow reactor in which the reactor temperature was held at 1000° C., the residence time for the reaction was 1 second, and the sulphur dioxide concentration was 3000 ppm. These are conditions within the range of those which would be encountered during downstream injection of a sorbent for $SO_2$ capture in a coal-fired boiler. The increased calcium utilization by the sorbent-containing calcium lignosulfonate over the control sorbent (containing no surfactant) are shown in FIG. 1. At the optimum calcium lignosulfonate concentrations in the hydroxide (1.5 to 2.0 weight percent), calcium utilization increases of approximately 5% absolute (20 to 25% relative) is achieved. With calcium to sulphur ratio of 2 an $SO_2$ capture of over 60% is calculated.

EXAMPLE 2

Two sorbents were produced for testing in a pilot-scale, coal-fired combustor. The control sorbent was commercial Longview calcium hydroxide. The modified sorbent was made from commerical Longview calcium oxdie, experimentally hydrated with water containing calcium lignosulfonate to produce a hydroxide containing 1% calcium lignosulfonate. The sorbent was then injected into a $10^6$ Btu, coal-fired furnace at 1250° C. The resulting calcium utilizations of the control and modified sorbents are shown in FIG. 2. A 20 to 25% relative increase in calcium utilization by the modified sorbent is shown.

What is claimed is:

1. A method for preparing particulate calcium hydroxide/calcium lignosulfonate sorbent comprising the steps of contacting calcium oxide with water at a water to calcium oxide ratio of 2.6 with said water containing a sufficient amount of calcium lignosulfonate to result in the crystallization of calcium hydroxide/calcium lignosulfonate particles containing up to 5% by weight calcium lignosulfonate.

2. A method according to claim 1 wherein said calcium hydroxide/calcium lignosulfonate particles contain from 1 to 2% by weight calcium lignosulfonate.

3. A lignosulfonate-modified calcium hydroxide containing up to 5% by weight calcium lignosulfonate, having a finer particle size distribution than a corresponding non-surfactant modified sorbent.

4. A lignosulfonate-modified calcium hydroxide according to claim 3 containing from 1 to 2% by weight calcium lignosulfonate.

5. A method for reducing agglomeration and enhancing the handling characteristics of dry particulate calcium hydroxide or dry particulate calcium magnesium hydroxide comprising the step of hydrating calcium oxide or a mixture of calcium oxide and magnesium oxide in the presence of a sufficient amount of alkali metal lignosulfonate to produce up to 5% by weight of said lignosulfonate in said dry particulate hydroxide and said lignosulfonate.

6. A method according to claim 5 wherein said surfactant comprises calcium lignosulfonate.

* * * * *